US009880818B2

(12) United States Patent
Isman et al.

(10) Patent No.: US 9,880,818 B2
(45) Date of Patent: Jan. 30, 2018

(54) APPLICATION TESTING

(71) Applicant: Ab Initio Technology LLC, Lexington, MA (US)

(72) Inventors: Marshall A. Isman, Newton, MA (US); John Joyce, Newtonville, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 14/715,807

(22) Filed: May 19, 2015

(65) Prior Publication Data
US 2016/0124836 A1 May 5, 2016

Related U.S. Application Data

(60) Provisional application No. 62/075,451, filed on Nov. 5, 2014.

(51) Int. Cl.
*G06F 9/44* (2006.01)
*G06F 11/36* (2006.01)

(52) U.S. Cl.
CPC ............ *G06F 8/35* (2013.01); *G06F 11/3636* (2013.01); *G06F 8/34* (2013.01)

(58) Field of Classification Search
CPC ....... G06F 11/368; G06F 11/3636; G06F 8/34
See application file for complete search history.

(56) References Cited

U.S. PATENT DOCUMENTS

| | | | |
|---|---|---|---|
| 6,102,968 A | 8/2000 | Colby et al. | |
| 6,389,429 B1 * | 5/2002 | Kane | G06Q 10/06393 705/7.39 |
| 6,983,317 B1 * | 1/2006 | Bishop | H04L 43/0811 709/223 |
| 7,039,645 B1 * | 5/2006 | Neal | G06Q 30/06 |
| 8,627,296 B1 | 1/2014 | Picard | |
| 8,676,720 B1 * | 3/2014 | Neal | G06Q 10/08 705/343 |
| 8,949,140 B2 | 2/2015 | Liu et al. | |
| 2002/0152241 A1 * | 10/2002 | Hepworth | G06K 19/06 715/236 |

(Continued)

OTHER PUBLICATIONS

International Search Report and Written Opinion, PCT/US2015/059136, dated Feb. 15, 2016 (16 pages).

(Continued)

*Primary Examiner* — Viva Miller
(74) *Attorney, Agent, or Firm* — Fish & Richardson P.C.

(57) ABSTRACT

A method includes analyzing, by a processor, a first version of a computer program. The analyzing includes identifying a first data processing element included in the first version of the computer program. The first data processing element references a first data source external to the first version of the computer program. The method includes generating a data source element that represents a second data source different from the first data source. The method includes generating a second version of the computer program. The second version of the computer program includes the generated data source element and a second data processing element that is based on the first data processing element. In the second version of the computer program, the second data processing element references the generated data source element.

46 Claims, 12 Drawing Sheets

(56) References Cited

U.S. PATENT DOCUMENTS

| | | | |
|---|---|---|---|
| 2004/0153708 A1* | 8/2004 | Joshi | G06F 9/5088 |
| | | | 714/47.2 |
| 2007/0118278 A1* | 5/2007 | Finn | G06F 17/30241 |
| | | | 701/438 |
| 2008/0270350 A1 | 10/2008 | Bojanic et al. | |
| 2009/0133033 A1 | 5/2009 | Lindo et al. | |
| 2012/0131559 A1* | 5/2012 | Wu | G06F 8/75 |
| | | | 717/132 |
| 2012/0254259 A1 | 10/2012 | McGuire et al. | |
| 2014/0141767 A1* | 5/2014 | Sharma | H04W 24/04 |
| | | | 455/423 |
| 2016/0124998 A1 | 5/2016 | Offner et al. | |

OTHER PUBLICATIONS

Cheung et al., "Partial replay of long-running applications", Proceedings of the 19$^{th}$ ACM Sigsoft Symposium and the 13$^{th}$ European Conference on Foundations of Software Engineering, SIGSOFT/FSE, pp. 135-145 (2011).
Honarmand et al., "Reply Debugging: Leveraging Record and Replay for Program Debugging", ACM Sigarch Computer Architecture News, Architecture, pp. 445-456 (2014).
International Search Report and Written Opinion issued in PCT/US2017/033285, dated Jul. 26, 2017.

* cited by examiner

```
200
↙
// Each overlay file starts with a 3-line header
1 // version
$AI_MP/example_graph.mp // The graph these insertions will be applied
to.
1 // order insertions on write
// end of header; beginning of first insertion
ins_1_source.dat // name of the insertion      ←———— 202
Database/out   // upstream port ←———— 204
 Filter/in     // downstream port ←———— 206
0 // sequence number at upstream port
0 // is_probe it's a test source      ←———— 208
0 // is_local_file_probe ignored; only for probes
0 // is_phased_file_probe ignored; only for probes
0 // is_clean ignored; only for probes
1 // is_required ignored; only for probes
0 // is_modified
2 // number_of_parameters
!prototype_path:PFS|||$AB_COMPONENTS/Datasets/Input_File.mdc ←———— 210
Layout:$|||file:$AI_SERIAL/test_source_for_replicate.dat ←———— 212
// end of first insertion; beginning of second insertion
ins_2.dat // name of the insertion      ←———— 214
Gather/out // upstream port      ←———— 216
OutputDataSource/in // downstream port ←———— 218
0 // sequence number at upstream port
1 // is_probe it's a probe      ←———— 220
0 // is_local_file_probe
0 // is_phased_file_probe
0 // is_clean
1 // is_required
0 // is_modified ignored; only for test sources
1 // number_of_parameters
!prototype_path:PFS|||$AB_COMPONENTS/Datasets/Output_File.mdc ←———— 222
```

201 { (first insertion block)
213 { (second insertion block)

FIG. 2

APPLICATION TESTING

CLAIM OF PRIORITY

This application claims priority U.S. Provisional Patent Application Ser. No. 62/075,451, filed on Nov. 5, 2014, the entire contents of which are hereby incorporated by reference.

BACKGROUND

This description relates to debugging a graph.

Code developers often debug source code throughout the development process. In doing so, the source code can be modified with debug code which can impact the functionality of the source code. It is often desirable to remove the added debug code from the source code when debugging has concluded in order to restore the original functionality of the source code.

SUMMARY

In a general aspect, a method includes analyzing, by a processor, a first version of a computer program. The analyzing includes identifying a first data processing element included in the first version of the computer program. The first data processing element references a first data source external to the first version of the computer program. The method includes generating a data source element that represents a second data source different from the first data source. The method includes generating a second version of the computer program. The second version of the computer program includes the generated data source element and a second data processing element that is based on the first data processing element. In the second version of the computer program, the second data processing element references the generated data source element.

Embodiments can include one or more of the following features.

The method includes determining a location of the second data source. Determining the location of the second data source comprises receiving an input indicative of the location.

The method includes presenting, in a user interface, an identifier of the identified first data processing element, the first data source, or both. The method includes receiving a selection of the identified first data processing element, the first data source, or both.

Analyzing the first version of the computer program includes analyzing an input flow into at least one of the data processing elements in the first version of the computer program.

The method includes analyzing the first version of the computer program at runtime of the computer program.

The computer program includes a graph. Generating the second version of the computer program comprises locating the generated data source element at an input flow to the second data processing element.

Data from the second data source has the same format as data from the first data source.

Generating the data source element includes defining an overlay specification for the generated data source element.

The method includes populating the second data source with data based on data from the first data source.

In the first version of the computer program, a third data processing element references a first data destination external to the first version of the computer program. In the second version of the computer program, a fourth data processing element that is based on the third data processing element references a second data destination different from the first data destination.

The method includes identifying a third data processing element included in the first version of the computer program. The third data processing references a first data destination external to the first version of the computer program. The method includes generating an output element that represents a second data destination different from the first data destination. The second version of the computer program includes the generated output element and a fourth data processing element that is based on the third data processing element. In the second version of the computer program, the fourth data processing element references the generated output element. The method includes determining a location of the second data destination. Determining the location of the second data destination comprises receiving an input indicative of the location.

The method includes executing the second version of the computer program.

Executing the second version of the computer program enables debugging of the computer program.

Generating the second version of at least a portion of the computer program includes generating a copy of the portion of the computer program. The method includes modifying the copy of the portion of the computer program to include the generated data source element.

In a general aspect, a system includes means for analyzing, by a processor, a first version of a computer program. The analyzing includes identifying a first data processing element included in the first version of the computer program. The first data processing element references a first data source external to the first version of the computer program. The system includes means for generating a data source element that represents a second data source different from the first data source. The system includes means for generating a second version of the computer program. The second version of the computer program includes the generated data source element and a second data processing element that is based on the first data processing element. In the second version of the computer program, the second data processing element references the generated data source element.

In a general aspect, a system includes a processor coupled to a memory, the processor and memory configured to analyze, by the processor, a first version of a computer program. The analyzing includes identifying a first data processing element included in the first version of a computer program. The first data processing element references a first data source external to the first version of the computer program. The processor and memory are configured to generate a data source element that represents a second data source different from the first data source. The processor and memory are configured to generate a second version of at least a portion of the computer program. The second version of the computer program includes the generated data source element and a second data processing element that is based on the first data processing element. In the second version of the computer program, the second data processing element references the generated data source element.

In a general aspect, a non-transitory computer-readable medium stores instructions for causing a computing system to analyze, by a processor, a first version of a computer program. The analyzing includes identifying a first data processing element included in the first version of a computer program. The first data processing element references a first data source external to the first version of the computer program. The instructions cause the computing system to generate a data source element that represents a second data source different from the first data source. The instructions cause the computing system to generate a second version of at least a portion of the computer program. The second version of the computer program includes the generated data source element and a second data processing element that is based on the first data processing element. In the second version of the computer program, the second data processing element references the generated data source element.

Other features and advantages will become apparent from the following description, and from the claims.

DESCRIPTION OF DRAWINGS

FIG. 2 is an example of an overlay specification.

DESCRIPTION

Figure 1:
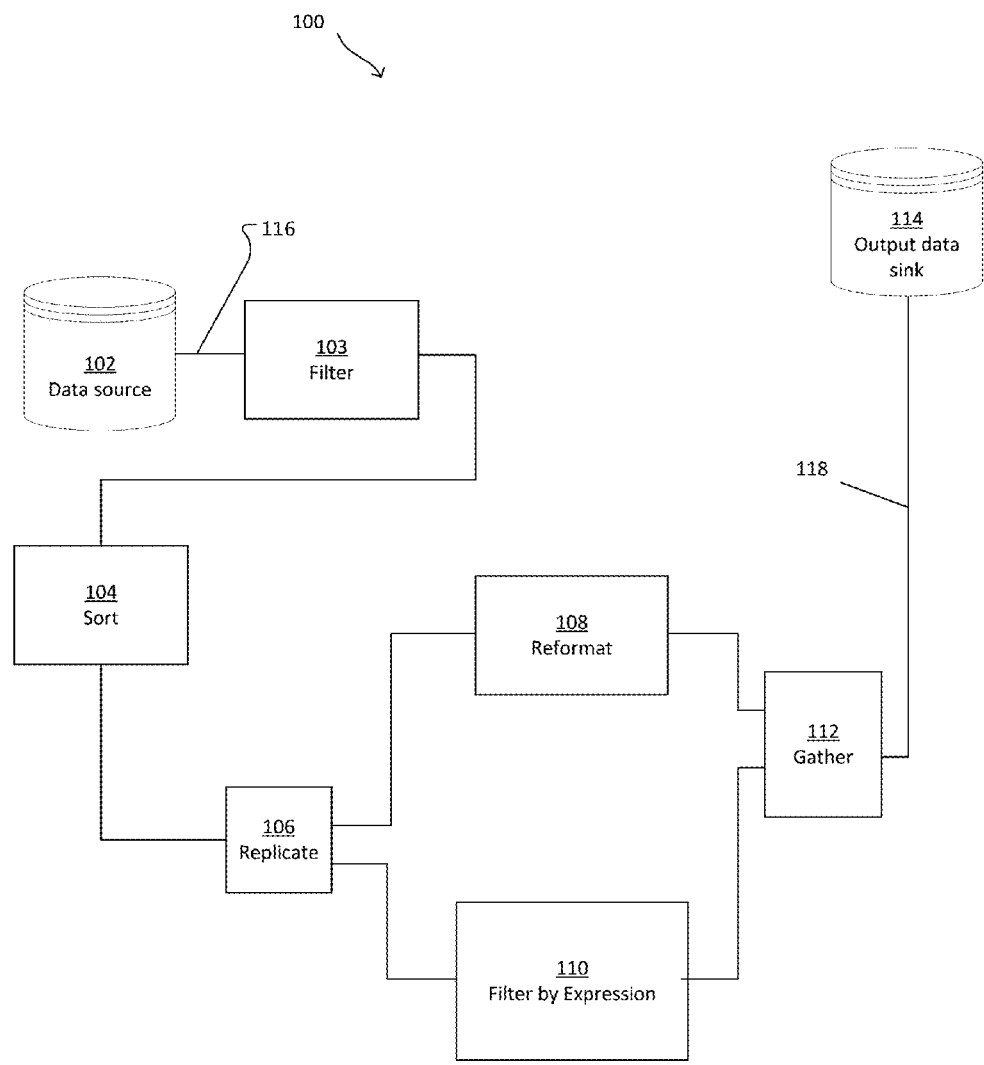
FIG. 1 is an example of a graph.

When testing or debugging an executable application, such as a graph, a tester or developer may want to conduct testing using a particular set of input data. In some examples, the tester may wish to make a change to the application. By executing the application using a consistent set of input data both before and after the change, the effect of that change on the data output by the application can be monitored. In some examples, the tester may have a specific set of test data that is to be used when testing the application, such as a set of test data that will cause all of the functions of the application to be executed at least once. Similarly, the tester may wish to write the data output by the application to a particular destination that is different than the standard destination to which the application writes its output data.

In a conventional development environment, the tester manually provides the desired set of input data for testing and specifies the destination for the output data. We describe here an approach to automatically identifying data sources that provide input data to an application and output data sinks that receive output data from an application. The identified data sources can be automatically replaced by replacement data sources, sometimes referred to as test sources. The identified output data sinks can be HI automatically replaced by alternative destinations, sometimes referred to as probes. Test sources and probes are examples of insertions.

In some examples, the executable application is a graph-based process. Insertions, such as test sources and probes, are objects that are associated with a flow in the graph-based process. A test source can replace data passing through a flow (e.g., upstream data) with new data, such that upstream computations do not need to be rerun for each execution of the graph. For instance, a test source can replace a data source such that test data is provided to the graph from the test source rather than from the data source. A probe can monitor data passing through a flow as the graph executes, and can cause the data to be saved for later examination or reuse. For instance, a probe can receive data that would otherwise have been saved to an output data sink, such as a database.

Insertions, such as test sources and probes, can be defined by an overlay specification, which is a file that is separate from the graph or other executable application. In some examples, the insertions can be defined automatically based on an automated analysis of the application, e.g., based on an automatic identification of the data sources and output data sinks of the application.

The insertions defined in the overlay specification can be added into the application during execution without becoming a part of the original application. When the application is compiled, a compiler considers the overlay file and generates an executable application that includes the insertions. We sometimes refer to the original application as the first version of the application and the application that includes the insertions as the second version of the application. For instance, in the example of a graph-based process, the executable graph can be visually represented as a second version of the graph that includes the components of a first version of the graph combined with the insertion objects defined in the overlay specification. In some examples, the executable graph is a shell script and is not stored in a file. In some examples, the executable graph and the graph are stored in separate files.

The incorporation of the insertions into the second version of the graph does not modify the first version of the graph being debugged. Instead, the insertion definitions remain in a separate file (e.g., the separate overlay specification) and can be turned into ordinary graph components for inclusion in the modified graph at the beginning of the code generation. As such, there is no risk of inadvertently breaking the original graph during debugging.

Insertions can also be introduced at locations in a graph other than at data sources and output data sinks. These insertions, which we sometimes refer to as internal insertions, can enable a tester to access the data as it flows through the graph. For example, a tester may wish to verify the data as it flows from one component to another.

A tester may also have verified that an upstream process functions correctly but may not have verified the downstream processes. In some cases, the upstream process may take a long time to execute, resulting in inefficient testing. Testing efficiency can be improved if the tester can replace previously validated upstream operations with previously validated data. In a conventional development environment, the tester would need to modify the graph in order to add a watch point or to replace upstream components with pre-validated data. However, once the graph has been edited, the tester cannot be sure that they have not modified the functionality of the original graph. In some environments, the tester may lack the necessary permissions to edit the graph.

FIG. 1 shows an example of a graph 100. The graph 100 is a visual representation of a computer program that includes data processing components connected by flows. A flow connecting two components indicates that records output from the first component are passed to the second component. A first component references a second component when the first component is connected to a second component by a flow.

A data source 102, such as a database (as shown), a file, a queue, an executable statement (e.g., a SQL statement) or another type of data source that is external to the graph 100, includes one or more data records to be processed by the graph 100. By external, we mean that the data of the data source 102 is not stored in the graph 100. The data source 102 is connected to a filter component 103 by a flow. In general, a filter component filters or removes records that do not meet predetermined criteria. In this example, the filter component 103 passes data records of customers who live in Ohio and rejects the other records. The filter component 103 is connected to a sort component 104 that sorts the filtered data records by zip code. The sort component 104 is connected to a replicate component 106 that creates a copy of data records so that they can be processed in two different ways. The replicate component is connected to a reformat component 108 and a filter by expression component 110. For example, one instance of data records of customers who live in Ohio, which are sorted by zip code, is sent to the reformat component 108, and another instance of the data records is sent to the filter by expression component 110. The reformat component 108 changes the format of the data records to a different data format, and the filter by expression component 110 removes data records based on an expression associated with the data record. The reformat component 108 and the filter by expression component 110 are connected to a gather component 112 that combines the received data records, and the gather component is connected to an output data sink component 114 that is external to the graph, such as a database (as shown), a file, a queue, or a downstream processing component. By external, we mean that the data of the output data sink 114 is not stored in the graph 100. While the graph 100 includes many flows between components, a flow 116 between the data source 102 and the filter component 103 (which we sometimes refer to as the source-filter flow 116) and a flow 118 between the gather component 112 and the output data sink 114 (which we sometimes refer to as the gather-output flow 118) are of particular interest in this example.

A tester of the graph 100 may wish to debug the graph 100 in order to verify its functionality. In some cases, a tester may want to verify data as it flows from one component to another. In some cases, a tester may want to bypass upstream components in a graph 100, and instead insert data at the locations of the bypassed components. In some cases, a tester may want to test the operation of the graph 100 using a consistent set of input data in order to monitor the effect of changing the graph on the data output by the graph. In some cases, a tester may want to test the operation of the graph 100 using a set of input data that the tester knows will cause all of the functions of the graph to be executed at least once, thus enabling complete testing of the graph.

In debugging the graph 100, it may be desirable to refrain from modifying the graph. For example, a tester may not want to risk breaking the functionality of the graph. In some examples, a tester may have limited or no access to the graph (e.g., the tester may lack the necessary permissions to edit the graph). In order to debug the graph 100 without modifying the graph, an overlay can be used to debug the graph. In some examples, the overlay can be specified automatically, e.g., based on an automated analysis of the graph. A second version of at least a portion of the graph 100 can be generated based on the original graph 100 (sometimes called the first version of the graph) and the overlay specification.

FIG. 2 shows an example of an overlay specification 200 that defines an overlay. The overlay specification 200 can be stored in a file. The file may be separate from a file containing the graph. The overlay specification defines one or more insertions. An insertion can be an object that is associated with a flow of the graph 100 and can take the form of a probe or a test source.

A probe collects or monitors data as it is passed through a flow between components of the graph 100, e.g., along a flow from a first component to a second component or along a flow to an output data sink. For example, data can be monitored, saved for later examination, or saved for re-use when it passes through a flow as the graph 100 executes. The overlay specification can define a probe that refers to a flow that carries data that is to be collected or monitored. The probe specifies the flow through which data is to be collected or monitored. The probe can be configured to report particular values, or report when a particular value is within or outside of a predetermined range. Data that is passed through the probe may be saved for later analysis or use, for example, the data can be stored in a flat file or relational database.

In some examples, the probe can refer to a flow from a component of the graph 100 to an output data sink, such as a file or a database. By placing a probe along a flow to a data sink during debugging of the graph 100, the probe receives the data output from the graph 100. For instance, each time the graph 100 is executed in a debugging mode, the output data can be received by a probe and written to a file so that the output data from various graph executions can be compared or otherwise evaluated. In some examples, an output data sink is automatically identified and an overlay is automatically specified to define a probe for insertion prior to the identified output data sink.

In some examples, the probe can refer to a flow from an upstream component of the graph 100 to a downstream component. By placing a probe along a flow to a downstream component during debugging of the graph 100, the probe receives the data that would otherwise have been received by the downstream component, thus preventing the downstream component from executing. For instance, a tester may wish to monitor the results of the graph processing prior to the downstream component. For instance, the downstream component may have a functionality that has an effect external to the graph, e.g., the downstream component may send a text message to each person whose credit card record is processed by the downstream component. During debugging of the graph, a tester may wish to disable such components that have an effect external to the graph.

A test source inserts data into the graph 100 at a particular flow between two components of the graph 100. The overlay specification can define a test source that refers to a flow that carries data that is to be replaced with data from the test source. In some examples, the test source replaces data that would normally pass through a flow with new data. In some scenarios, the test source can be configured to read previously saved data, and pass the data to the downstream component. In some examples, a test source inserts data into the graph 100 at a flow from a data source, such as a database or file. The test source can insert data having the same format as the data that would otherwise have been provided by the data source. In some examples, a data source is automatically identified and an overlay is automatically specified to define a test source to replace the identified data source.

In some examples, the results of the execution of the graph 100 up to a certain point (e.g., up to a certain component) may have been previously verified. In other words, upstream process functions may have been verified up to a certain point. In such cases, it may be inefficient for upstream components to reprocess functions every time the graph 100 executes. The test source can insert data (e.g., the previously verified data) into the graph at that certain point. In this manner, entire sections of a graph 100 that were previously executed may be bypassed.

FIG. 2 shows an example of an overlay specification 200 that defines an overlay. The overlay specification 200 can include one or more insertion definitions. In this example, the overlay specification 200 includes one test source definition 201 and one probe definition 213. The overlay specification 200 starts with a 3-line header that specifies the graph that the insertion definitions can correspond to. The header is followed by the test source definition 201, which includes a name 202, an upstream port 204, a downstream port 206, an insertion type 208, a prototype path 210, and a layout parameter 212.

The upstream port 204 of the test source definition 201 references an output port of the component that is directly upstream from the flow where the test source is to be inserted into the graph 100. A component that is upstream from a flow is a component from whose output port data is output onto the flow. In the example of FIG. 2, the upstream port 204 of the test source definition 201 points to the output of the database 102. The downstream port 206 of the test source definition 201 references an input port of the component that is directly downstream from the flow where the test source is to be inserted into the graph 100. A component that is downstream from a flow is a component at whose input port data is received from the flow. In the example of FIG. 2, the downstream port 206 of the test source definition points to the input of the filter component 103. The test source definition 201 in this example thus indicates that a test source is to be placed in the flow between the output of the database 102 and the input of the filter component 103 such that data provided by the test source can replace input data from the database 102.

The insertion type 208 defines whether the insertion is a test source or a probe. A value of "0" defines a test source, and a value of "1" defines a probe. Because this insertion is a test source, the value of the insertion type 208 is "0".

The prototype path 210 indicates the type of the insertion. In this example, because this insertion is a test source, the prototype path 210 specifies an input file component. The prototype path 210 points to a file that contains the code that defines an insertion of the particular type. A layout parameter 212 defines a location of a source file that contains data that the test source will contain. In some examples, the location is a file path. The data in the source file is to replace the data that would normally pass through the flow defined by the upstream port 204 and the downstream port 206. That is, when the test source is applied to the graph 100, the filter component 103 receives the data in the source file rather than receiving data from the database 102.

The source file contains data having the same format as the data that would otherwise be received by the component downstream of the test source. In some examples, the data in the source file may be the same as the data in the data source (e.g., the database) that is upstream from the test source. For instance, data records from the database 102 can be copied into the source file. In some examples, the data source indicates an executable statement, such as a SQL query. In these examples, the SQL query can be executed and the results of the query execution can be stored in the source file. In some examples, the data in the source file can be obtained from somewhere other than the data source. For instance, the data in the source file can be generated in order to ensure that certain data (e.g., certain ranges of values) are processed for complete debugging of the graph 100. In some examples, the data in the source file remains the same even if the data in the data source changes, thus allowing debugging to continue with a consistent set of input data.

In some examples, the data in the source file may be the same as the data that would pass through the flow during normal execution of the graph 100, but by inserting the data using a test source, upstream components can refrain from processing. For example, an upstream component, such as the replicate component 106, may require large amounts of system resources to process the data, or may take a relatively long time to process the data compared to other components in the data flow graph 100. As such, known data (e.g., the same data that would pass through the flow during normal execution) can be inserted into the flow to save time or to conserve system resources.

The test source definition 201 is followed by a probe definition 213, which includes a name 214, an upstream port 216, a downstream port 218, an insertion type 220, and a prototype path 222.

The upstream port 216 of the probe definition 213 references an output port of the component that is directly upstream from the flow where the probe is to be inserted into the graph 100. In the example of FIG. 2, the upstream port 216 of the probe definition 213 points to the output of the gather component 112. The downstream port 218 of the probe definition 213 references an input port of the component that is directly downstream from the flow where the probe is to be inserted into the graph 100. In the example of FIG. 2, the downstream port 218 of the probe definition 213 points to the output data sink component 114. The probe definition 213 in this example thus indicates that a probe is to be placed in the flow between the output of the gather component 112 and the output data sink component 114 such that the probe receives data that would otherwise have been written to the output data sink component.

The insertion type 220 of the probe definition 213 defines whether the insertion is a test source or a probe. A value of "1" defines a probe. Because this insertion is a probe, the value of the insertion type 220 is "1".

The prototype path 222 indicates the type of the insertion. In this example, because this insertion is a probe, the prototype path 222 specifies an output file component. The prototype path 222 points to a file that contains the code that defines an insertion of the particular type.

In some examples, the data that is to be monitored by the probe is stored in a file that is automatically created by the system. The file can be stored in a location that is determined by the system. The probe monitors data that passes through the flow defined by the upstream port 216 and the downstream port 218. That is, when the probe is applied to the graph 100, the data that passes from the output of the gather component 112 to the input of the output data sink component 114 is monitored and stored in the file that is automatically created by the system. In some examples, the data can be monitored before it is stored. The file is capable of receiving data of the same format that would have been received by the component referenced by the probe definition (in this example, the external data sink component 114).

In some examples, one or more insertions can be defined by the overlay specification as a result of an automated analysis of the graph 100. For instance, an automated analysis of the graph 100 can be conducted to identify any data sources, such as databases, files, or other types of data sources. One or more of the identified data sources can be automatically replaced by a test source. By a replaced data source, we mean that a test source is inserted into the flow directly downstream of the data source such that data from the test source is provided to the downstream component rather than data from the data source. Similarly, an automated analysis of the graph 100 can identify any output data sinks, such as databases, files, or other types of output data sinks. One or more of the identified output data sinks can be automatically replaced by a probe. By a replaced output data sink, we mean that a probe is inserted into the flow directly upstream of the output data sink such that data from the upstream component is received by the probe rather than by the output data sink. Automated analysis of the graph 100 can also be used to identify other components, such as a particular type of component (e.g., a particular type of component whose execution has an effect external to the graph 100).

Figure 3:
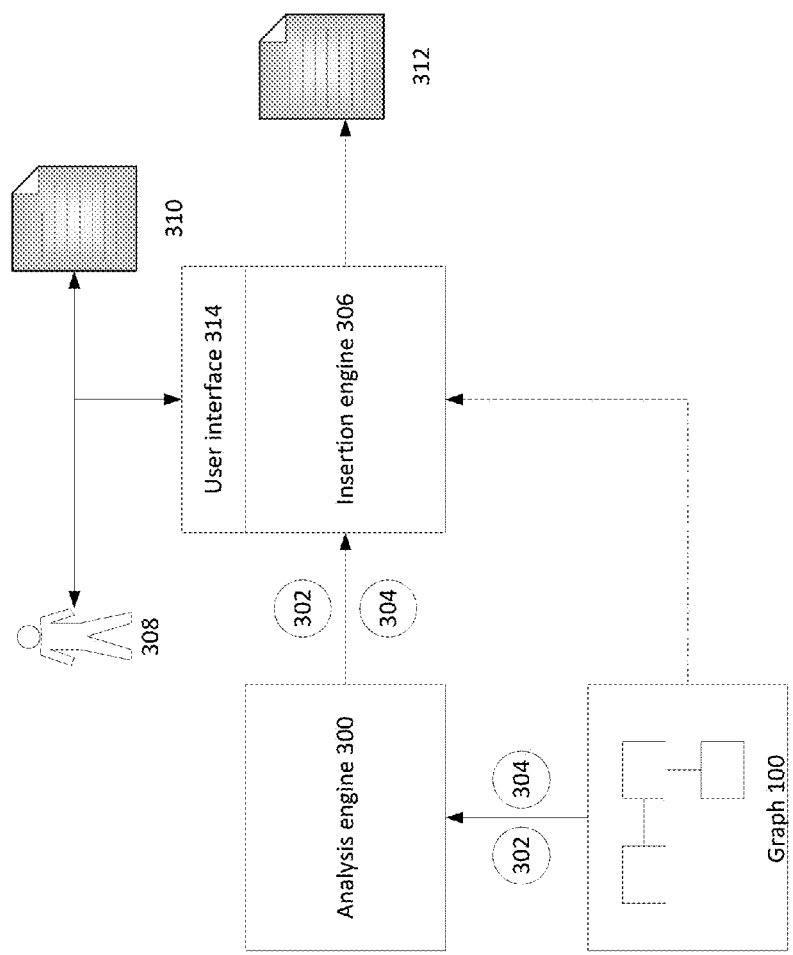
FIG. 3 is a block diagram.

Referring to FIG. 3, an analysis engine 300 automatically analyzes the graph 100 to identify data sources 302 and output data sinks 304. For instance, the analysis engine 300 can access the parameters and connections for each node of the graph 100. If a given node has no incoming connections, the analysis engine 300 identifies the node as a data source. Similarly, if a given node has no outgoing connections, the analysis engine 300 identifies the node as an output data sink. To access and analyze each node of a graph, the analysis engine "walks" along all of the connections of the graph. In some examples, the graph 100 is not instantiated or parameterized until runtime (e.g., when processing starts for debugging purposes). The analysis engine 300 can perform an automated analysis at runtime to identify data sources and output data sinks in the graph 100.

The analysis engine 300 sends identifiers of the data sources 302 and output data sinks 304 to an insertion engine 306, which determines which of the data sources and output data sinks are to be replaced by test sources and probes, respectively. In some examples, a tester 308 provides a list 310 of data sources and output data sinks that are to be replaced by test sources and probes. The list 310 can be provided as a file, a database, or in another format. For instance, the tester 308 might include on the list 310 any data source that he expects to change frequently. By replacing such a data source with a test source, the tester 308 can ensure that the graph can be tested using consistent input data.

The insertion engine 306 compares each identified data source 302 and output data sink 304 with the data sources and output data sinks on the list 310. The insertion engine creates an overlay specification 312 for any data source 302 or output data sink 304 that appears on the list 310. In some examples, parameters for the overlay specification 312, such as upstream and downstream ports, is provided to the insertion engine 306 by the analysis engine 300. In some examples, the insertion engine 306 accesses the graph 100 to obtain the relevant parameters.

To create an overlay specification 312 for a test source, the insertion engine 306 populates the source file with data. In some examples, the insertion engine 306 populates the source file for a test source that will replace a particular data source 302 with data copied from the data source 302. In some examples, the data source 302 includes an executable expression, such as a SQL statement, and the insertion engine 306 executes the executable expression and populates the source file with the results of the execution. In some examples, the insertion engine 306 can prompt the tester 308 for data for the source file through a user interface 314. For instance, the insertion engine 306 can present a list of the identified data sources 302 to the tester 308 such that the tester 308 can select which of the identified data sources 302 are to be replaced by a test source. The tester 308 can also specify the data to be included in the source file for the test source. In some cases, the tester 308 can identify a location (e.g., a path) of a file that includes data for the test source. In some cases, the tester 308 can instruct the insertion engine 308 to generate a source file that is a copy of the data in the original data source 302. In some cases, the tester 308 can instruct the insertion engine 308 to execute an executable expression, such as a SQL statement, that is included or associated with the original data source 302. In some cases, the tester 308 can cause data to be generated for the source file of the test source. For instance, the tester 308 may provide a set of data, such as real data or generated data, that will cause every function in the graph to execute at least once.

To create an overlay specification 312 for a probe, the insertion engine 308 determines the location of the file where the output data is to be stored. In some examples, the location is set by default, e.g., by a system architect. In some examples, the insertion engine 306 can prompt the tester 308 through the user interface 314 to specify a location for the output data file.

Figure 4:
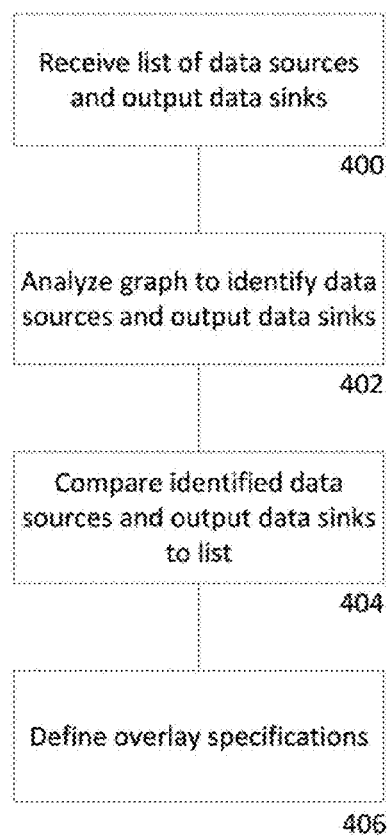
FIG. 4 is a flow chart.

Referring to FIG. 4, in a general approach to automatically defining insertions, a list of data sources and output data sinks that are to be replaced by test sources and probes, respectively, is received (400). For instance, the list can be provided by a tester based on his knowledge of the data sources and output data sinks or based on goals or objectives for the debugging. In some examples, the list can also include identifiers, such as locations and filenames, of files that are to replace the data sources and output data sinks that are included on the list.

A graph is analyzed automatically, e.g., by a processor, to identify data sources, output data sinks, or both in the graph (402). In particular, components that have no incoming connections are identified as data sources and components that have no outgoing connections are identified as output data sinks. For instance, each component is analyzed to identify its incoming and outgoing connections, and each connection from each component is followed to the adjacent component to identify the incoming and outgoing connections of that component. In this way, all of the components of the graph can be analyzed. In some examples, the analysis can be performed automatically at runtime, e.g., after the graph has been parameterized. In some examples, the analysis can be performed automatically and dynamically, e.g., while the graph is running. For instance, a dynamic analysis can be performed when certain parameters are resolved during the execution of the graph. In some examples, the graph is received into short-term memory, from where it is analyzed by a processor to identify data sources or output data sinks.

The identified data sources and output data sinks are automatically compared to the data sources and output data sinks on the list (404). An overlay specification is defined for each identified data source or output data sink that is included on the list (406). Prior to execution of the graph, a compiler may compile the graph into an executable graph. As part of compilation, the compiler considers the overlay specification 200. For example, the compiler may accept the overlay specification 200 as an input. One or more insertions are processed and inserted into the graph in the form of objects that each corresponds to an insertion definition contained in the overlay specification 200. The insertion objects may be represented in the second version of the graph 500 (shown in FIG. 5A) along with the data processing components included in the first version of the graph 100. The insertion objects may be connected to data processing components or other insertions by directed flows. However, the overlay specification 200, or the file that stores the overlay specification, remains separate from a file containing the graph. That is, while the insertion objects may appear in the second version of the graph 500 along with the data processing components included in the first version of the graph 100, the file containing the first version of the graph 100 does not include insertion definitions. The insertion objects are sometimes simply referred to as insertions.

In some examples, the tester does not supply an initial list of data sources and output data sinks that are to be replaced. Rather, the graph is automatically analyzed and a list of all of the data sources and output data sinks associated with the graph is presented to the tester through a user interface. The tester can select one or more of the data sources and output data sinks to be replaced by insertions. The tester can identifiers, such as locations and filenames, of files that are to replace the data sources and output data sinks that are included on the list, or can provide instructions for the generation of the source file for an insertion.

Insertions defined in the overlay specification can be executed using one of at least two modes: Single-Execution Mode and Saved-State Mode.

Figure 6:
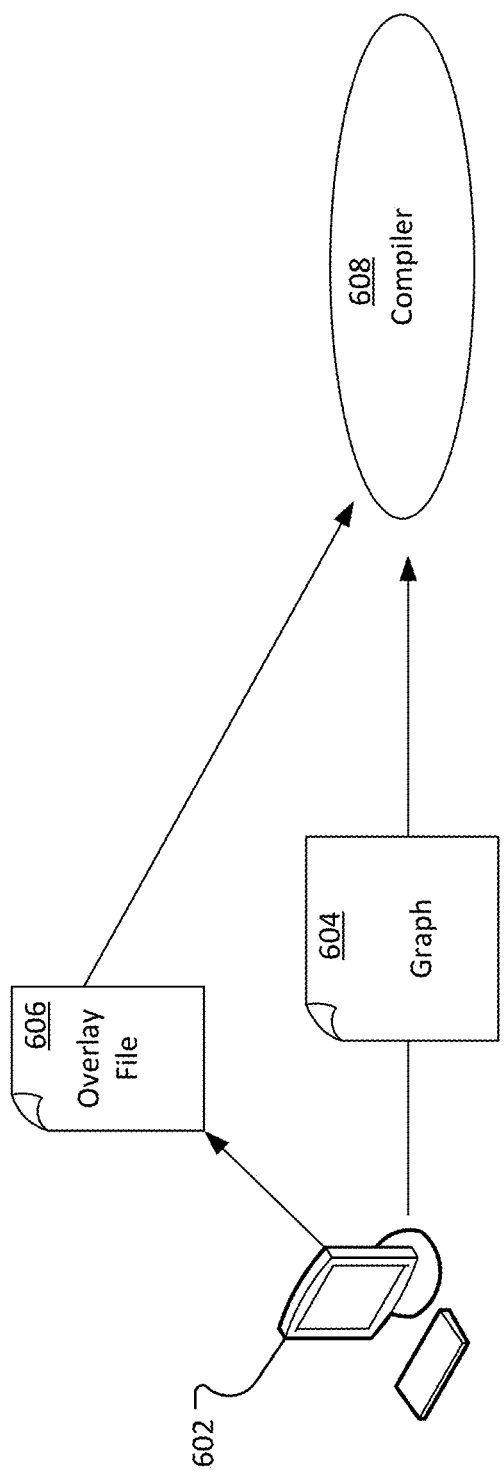
FIGS. 6-8 are block diagrams.

FIG. 6 illustrates an example system for executing insertion definitions in Single-Execution Mode. In this example, a client 602 generates or references a first version of a graph 604 and an overlay file 606 (e.g., an overlay specification) that defines insertions. For example, the overlay file 606 may be the overlay specification 200 of FIG. 2. The graph 604 is then compiled by the compiler 608. The compiler 608 considers the overlay file 606 and creates a second version of the graph. The second version of the graph is executable and includes the insertions defined by the overlay file 606. The second version of the graph can then be executed. In some examples, the compilation and the execution occur concurrently. If the second version of the graph is to be executed again, this process is repeated, including re-specifying, re-compiling the graph 604 and re-executing second version of the graph. No information is saved from one execution of the executable graph to the next.

Figure 5A:
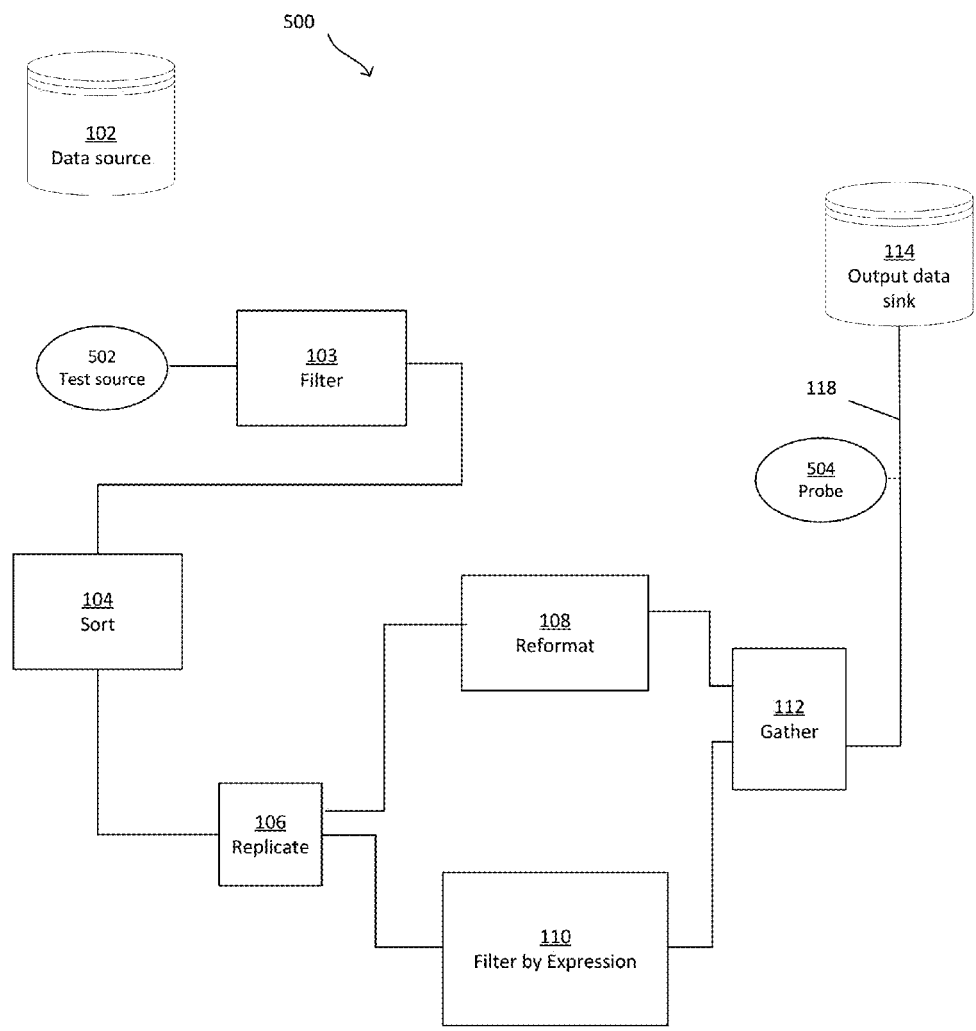
FIGS. 5A-5D are examples of modified graphs.

FIG. 5A shows an example of a second version of a graph 500. The second version of the graph 500 is a visual representation of the graph. In this example, second version of the graph 500 is similar to the first version of the graph 100 of FIG. 1 and has been modified to include insertions. The second version of the graph 500 includes representations of the insertions defined in the overlay specification 200 of FIG. 2. The test source insertion 502 corresponds to the test source definition 201 and the probe insertion 504 corresponds to the probe definition 213. In this example, insertions were generated when a compiler compiled the graph 100. While FIG. 5A shows a second version of the graph 500, the original, first version of the graph 100 remains unmodified.

The test source insertion 502 is placed between the output of the data source 102 and the input of the filter component 103, where the flow 116 had been located in the first version of the graph 100. The location of the insertion is based on the upstream port 204 and the downstream port 206 in the test source definition (FIG. 2). When the second version of the graph 500 is executed, data does not flow from the data source 102 to the filter component 103, as was the case in the first version of the graph 100. Instead, data from the source file identified by the layout parameter 212 in the test source definition 201 of the test source 502 flows to the filter component 103.

The probe insertion 504 is placed in the flow 118, between the output of the gather component 112 and the input of the output data sink component 114. The location of the insertion is based on the upstream port 216 and the downstream port 218 in the probe definition 213 (FIG. 2). When the second version of the graph 500 is executed, data that flows from the gather component 112 to the output data sink component 114 is monitored and stored by the probe insertion 504. As mentioned above, to execute the executable graph again, the graph is re-specified, re-compiled, and the executable graph is to be re-executed. No information is saved from one execution of the executable graph to the next. For example, if the executable graph were to be executed again, the probe insertion 504 would be repopulated with the same data.

Figure 5B:
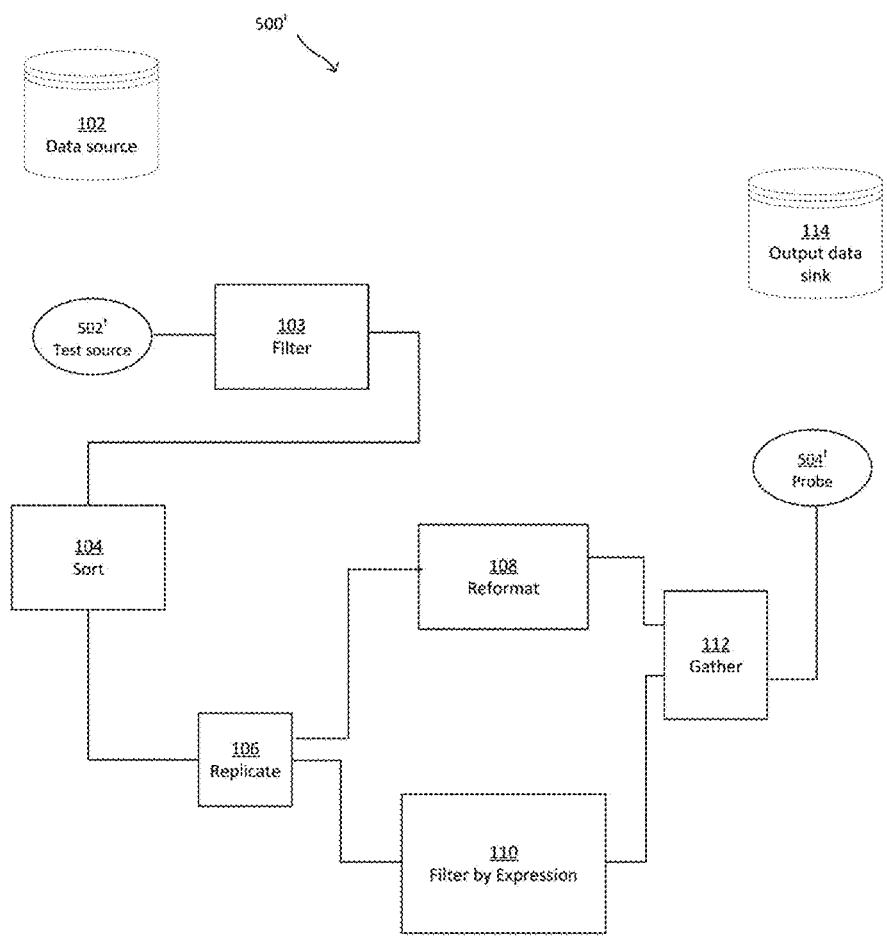

In the example of FIG. 5A, the data flowing along flow 118 is received by both the probe insertion 504 and the output data sink component 114. Referring to FIG. 5B, in some examples, a second version of the graph 500' can include a probe insertion 504' that interrupt the flow to the output data sink component 114 such that data is received by the probe insertion 504' and does not flow to the output data sink component 114.

Figure 5C:
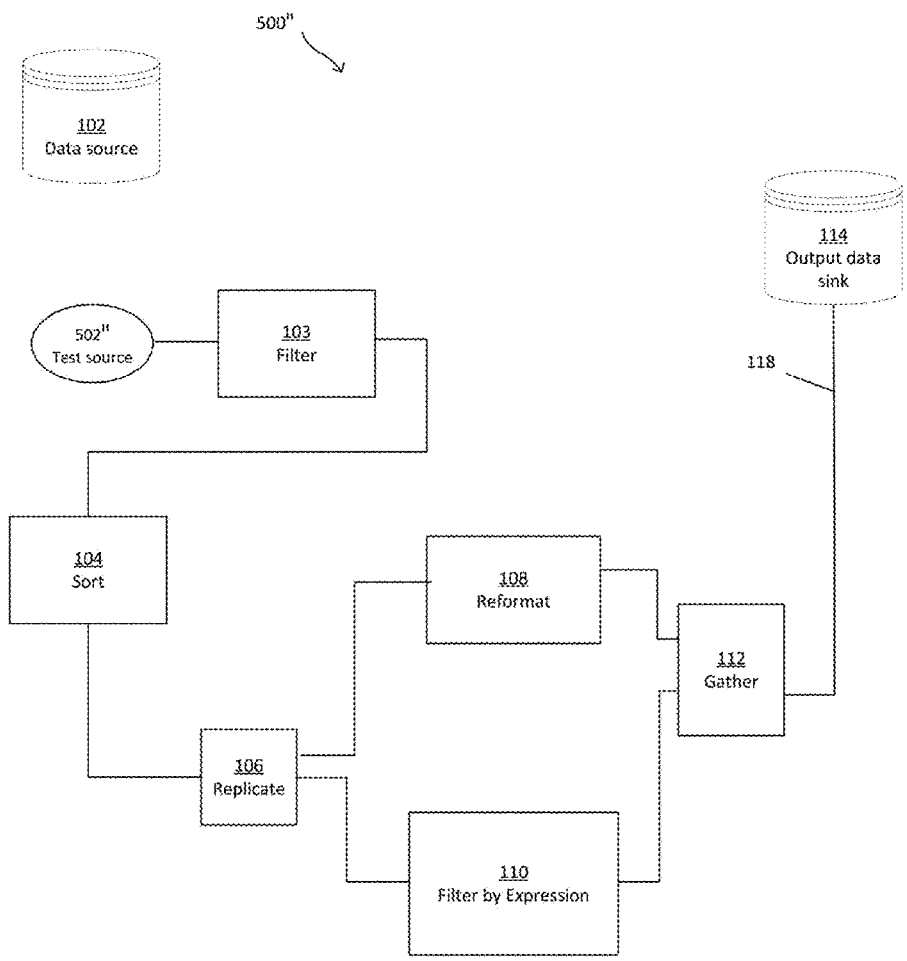
Figure 5D:
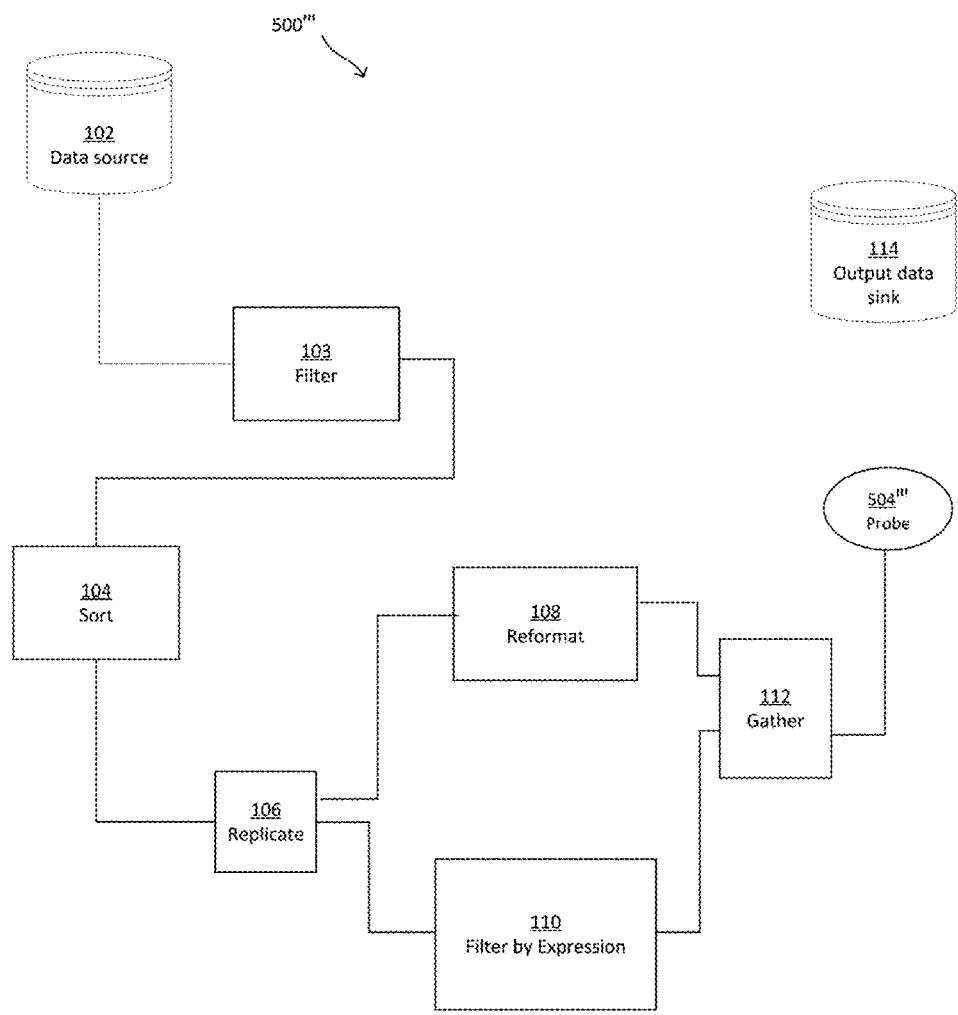

In the examples of FIGS. 5A and 5B, the second version of the graph 500, 500' includes both the test source insertion 502 (or 502') and the probe insertion 504 (or 504'). In some examples, the second version of a graph can include multiple test source insertions and multiple probe insertions. Referring to FIG. 5C, in some examples, a second version of a graph 500" can include one or more test source insertions 502" but no probe insertions. Referring to FIG. 5D, in some examples, the second version of a graph 500''' can include one or more probe insertions 504''' but no test source insertions.

Figure 7:
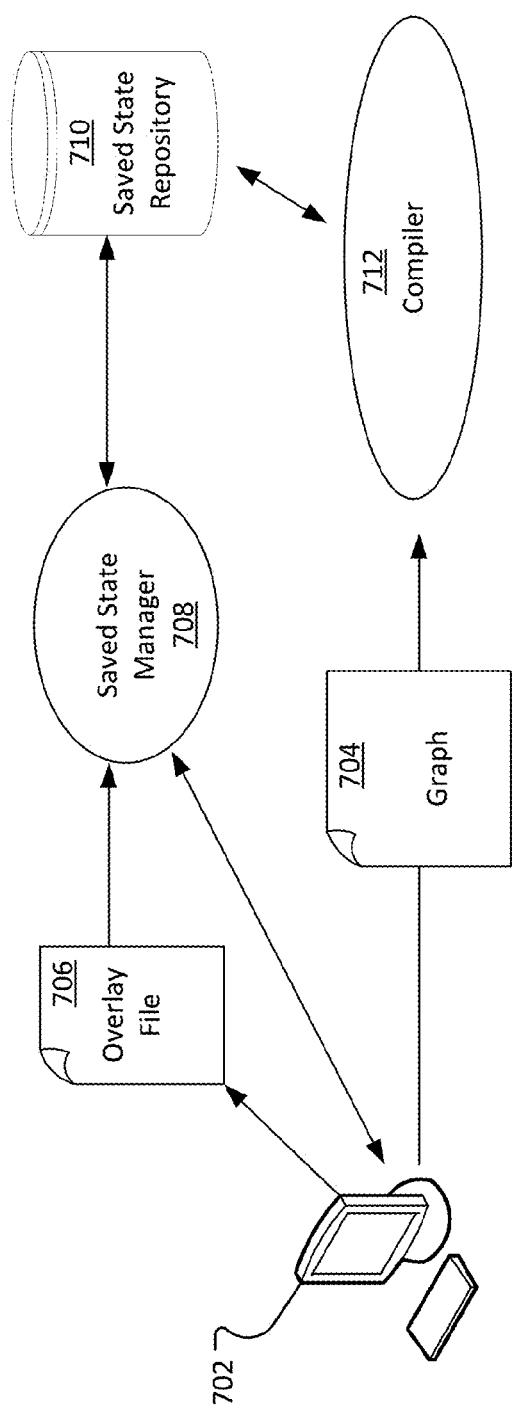

FIG. 7 illustrates an example system for executing insertion definitions in Saved-State Mode with a saved state manager 708. In this example, a client 702 generates or references a graph 704 and an overlay file 706 (e.g., an overlay specification) that defines insertions. For example, the overlay file 706 may be the overlay specification 200 of FIG. 2. The saved state repository 710 is managed by the saved state manager 708 and a compiler 712. The saved state manager 708 can also identify where the saved state data is located within the saved state repository 710. The graph 704 is compiled by the compiler 712. The compiler 712 considers the overlay file 706 and creates a second version of the graph that includes the insertions defined by the overlay file 706. The second version of the graph can then be executed. In some examples, the compilation and the execution occur concurrently. Saved-State Mode differs from Single-Execution Mode in that Saved-State Mode allows the executable graph to execute a number of times while saving information between executions. For example, referring to FIG. 5A, if the insertions defined in the overlay specification 200 of FIG. 2 were executed using Saved-State Mode, the probe insertion 504 that was populated on the first execution of the second version of the graph may not need to be repopulated during a second execution. In some examples, the probe insertion 504 could be internally transformed into a test source on the second execution because the probe insertion 504 would essentially be inserting data into the graph at the flow between the output of the gather component 112 and the input of the output data sink component 114.

The saved state manager 708, which can reside in a saved state manager directory, manages the saved state. Examples of information that can be saved in the saved state repository 710 include information related to probe insertions, information related to test source insertions, information related to the overlay file 706, and parameters (e.g., attributes) associated with graph components, among other information.

In some examples, when an executable graph is executed, only particular portions of the graph are executed. That is, only particular components of the graph are executed. In some examples, fewer than all of the components of the graph are executed. The executable graph may only execute components that will impact an insertion. For example, the executable graph may only execute portions of the graph that are necessary for the defined probe insertions to monitor and store data. In some examples, components that are downstream from the most downstream probe may not need to be executed. In some examples, the second version of the graph is a second version of the entire original graph. In some examples, the second version of the graph is a second version of only a portion of the entire original graph, e.g., a second version of only those portions of the graph that are relevant for the defined insertions.

In some examples, a probe is populated on the first execution of the executable graph. Between executions, parameters of one or more of the graph components may be changed. A component's parameters define how the component operates. The parameters associated with the components can be tracked so that the compiler 712 can determine when a parameter change has occurred in a component. A last value table keeps track of the parameters associated with the graph components. When the executable graph is run, the last value table is compared to the current parameters of the components to determine whether any parameters have changed between runs. When a parameter change occurs, the change may or may not impact the data that is stored by the probe. The compiler 712 determines whether the component and the change affect the data that will be stored by the probe on the next execution of the executable graph. If the data that will be stored by the probe would be affected by the change, then the changed component, as well as components that reside on flows between the changed component and the probe, are re-executed during the next execution of the executable graph. In other words, a component between the changed component and the probe is re-executed if the changed component impacts the execution of the component, and the component impacts the data that is stored by the probe. If the data that will be stored by the probe would be unaffected by the change, then none of the components may need to be re-executed.

Figure 8:
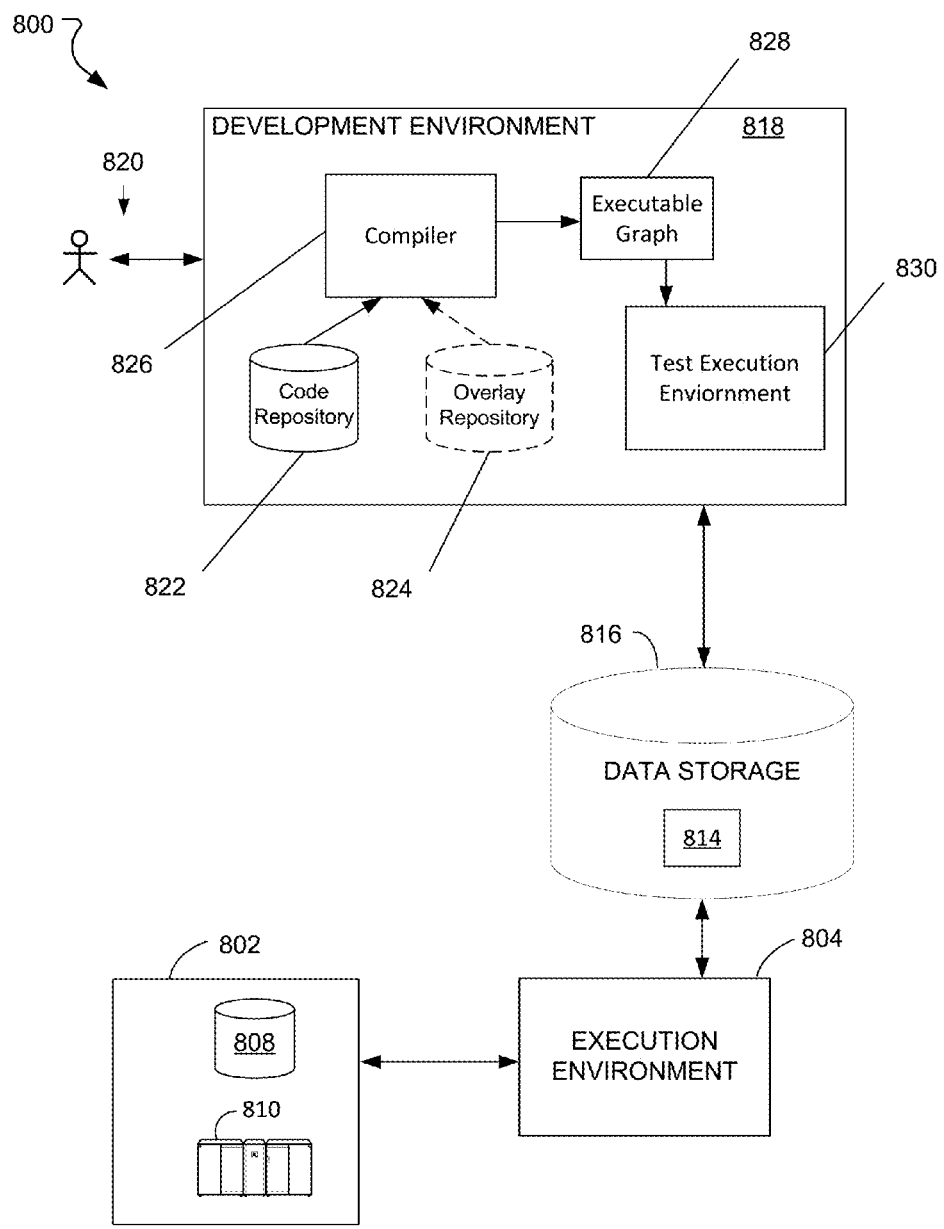

FIG. 8 shows an example data processing system 800 in which the debugging techniques can be used. The system 800 includes a data source 802 that may include one or more sources of data such as storage devices or connections to online data streams, each of which may store or provide data in any of a variety of formats (e.g., database tables, spreadsheet files, flat text files, or a native format used by a mainframe). An execution environment 804 and development environment 818 may be hosted, for example, on one or more general-purpose computers under the control of a suitable operating system, such as a version of the UNIX operating system. For example, the execution environment 804 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

The execution environment 804 reads data from the data source 802 and generates output data. Storage devices providing the data source 802 may be local to the execution environment 804, for example, being stored on a storage medium connected to a computer hosting the execution environment 804 (e.g., hard drive 808), or may be remote to the execution environment 804, for example, being hosted on a remote system (e.g., mainframe 810) in communication with a computer hosting the execution environment 804, over a remote connection (e.g., provided by a cloud computing infrastructure). The data source 802 may contain the data that is defined in a test source definition (e.g., the test source definition 201 of FIG. 2). That is, the layout parameter 212 of the test source definition 201 may point to a location of a source file in the data source 802.

The output data may be stored back in the data source 802 or in a data storage system 816 accessible to the execution environment 804, or otherwise used. The data storage system 816 is also accessible to the development environment 818 in which a developer 820 is able to develop, debug, and test graphs. The development environment 818 is, in some implementations, a system for developing applications as graphs that include vertices (representing data processing components or datasets) connected by directed flows (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the flows of the graph can use TCP/IP or UNIX domain sockets, or use shared memory to pass data between the processes).

The development environment 818 includes a code repository 822 for storing source code. In some examples, the source code and overlay specifications (e.g., the overlay specification 220 of FIG. 2) may be developed by a developer 820 who has access to the development environment, for example, through a user interface. In some examples, the source code and overlay specifications are determined automatically, e.g., by the analysis engine 300 and insertion engine 306 described above. In some examples, graphs and overlay specifications can be stored in the code repository 822. In some examples, graphs are stored in the code repository 822, and overlay specifications are stored in a separate overlay repository 824.

One or both of the code repository 822 and the overlay repository 824 may be in communication with a compiler 826. The compiler 826 can compile a first version of a graph and an overlay specification (e.g., the overlay specification 200 of FIG. 2) into an executable second version of the graph 828. For example, the compiler may accept the overlay specification as an input. One or more insertions are processed and inserted into the graph in the form of objects that each corresponds to an insertion definition contained in the overlay specification. The second version of the graph 828 can be visually represented by a modified graph (e.g., the second version of the graph 500 of FIG. 5A). The insertion objects may be represented in the second version of the graph 500.

The development environment 818 can include a test execution environment 830 for executing the second version of the graph 828. For example, once a graph is compiled by the compiler 826, the second version of the graph 828 can be executed. Executing the second version of the graph 828 can include executing computations associated with the components, insertions, and directed flows of the second version of the graph 828 as data (e.g., work elements or data records) flows between components. In some examples, the test execution environment 830 executes the second version of the graph 828 without modifying the source code of the first version graph that is stored in the code repository 822 or the source code stored in the overlay repository 824. The test execution environment 830 may be accessible through an interface of the development environment 818, or may have its own interface. The interface can be configured to display information related to the executions. The interface can also be configured to display information related to the insertions (e.g., the data being monitored and saved by a probe, or the data being inserted by a test source). The test execution environment 830 may allow the developer 820 to execute the second version of the graph 828 multiple times and modify aspects of the second version of the graph 828 in between executions.

In some examples, a developer directs the insertions and compiling of the graph. For instance, a developer 820 selects, from the code repository 822, the first version of the graph 100 of FIG. 1. The developer 820 also selects, from the overlay repository 824, the overlay specification 200 of FIG. 2. In some examples, instead of selecting the overlay specification 200, the developer 820 may select insertion definitions from various overlay specification in the overlay repository 824. The developer 820 instructs the compiler 826 to compile the second version of the graph 828 based on the first version of the graph 100 and the overlay specification 200.

In some examples, the insertions are inserted automatically. For instance, as described above, data sources and output data sinks in the graph 100 are automatically identified, e.g., by identifying components that have no incoming connections or no outgoing connections. The identified data sources and output data sinks are automatically compared to a list of data sources and output data sinks that are to be replaced by insertions during debugging of the graph 100. For instance, the list can be provided by the developer 820. Overlay specifications are automatically created for the data sources and output data sinks of the graph 100 according to the list. The second version of the graph is then compiled automatically.

In some examples, after execution, the developer 820 can evaluate the data output into the probe insertion 504. If necessary, the developer 820 can make changes to the first version of graph 100 and re-execute the changed first version of the graph 100, still using the same input data from the test source 502. By keeping the input data the same across multiple turns of execution of the graph, the developer 820 can compare the data output from the changed first version of the graph with the previously outputted data to determine whether the first version of the graph is performing as desired.

In some examples, during or after execution, the developer 820 can observe information related to the executions of the second version of the graph 828 and its components, insertions, and flows. For example, referring back to FIG. 5A, the developer 820 may observe that the data monitored and stored by the probe insertion 504 is incorrect or unexpected. The developer 820 may select, from the overlay repository 824, a probe insertion definition that defines a probe to be inserted in the flow between the reformat component 108 and the gather component 112, and a probe insertion definition that defines a probe to be inserted in the flow between the filter by expression component and the gather component 112. The developer 820 can analyze the data collected by these two probes to determine whether the data from the reformat component 108 or the data from the filter by expression component 110 is causing the data being output from the gather component 112 to be incorrect.

Continuing with this example, suppose the developer 820 determines that the data from the filter by expression component 110 is incorrect. Rather than debugging all of the components upstream from the filter by expression component 110 (e.g., the filter component 103, the sort component 104, and the replicate component 106) to determine the cause of the incorrect data, the developer 820 may elect to insert correct data (e.g., data that is expected to be output from the filter by expression component 110) into the flow between the filter by expression component 110 and the gather component 112. The developer 820 can select, from the overlay repository 824, a test source insertion definition that defines a test source to be inserted in the flow between the filter by expression component 110 and the gather component 112. This approach may be appropriate if the developer 820 is concerned with debugging components of the second version of the graph 500 that are downstream from the filter by expression component 110.

In some examples, overlay specifications are not permanently stored as files in a code repository 822 or an overlay repository 824. Rather, the information that would typically be included in the overlay file (e.g., insertion definitions) is developed by the developer 820 (e.g., through the user interface) or determined automatically by the analysis engine 300 and insertion engine 306 and temporarily stored in memory. The overlay information is then passed to the compiler (e.g., 608 of FIG. 6) or the saved state manager (e.g., 708 of FIG. 7).

Figure 9:
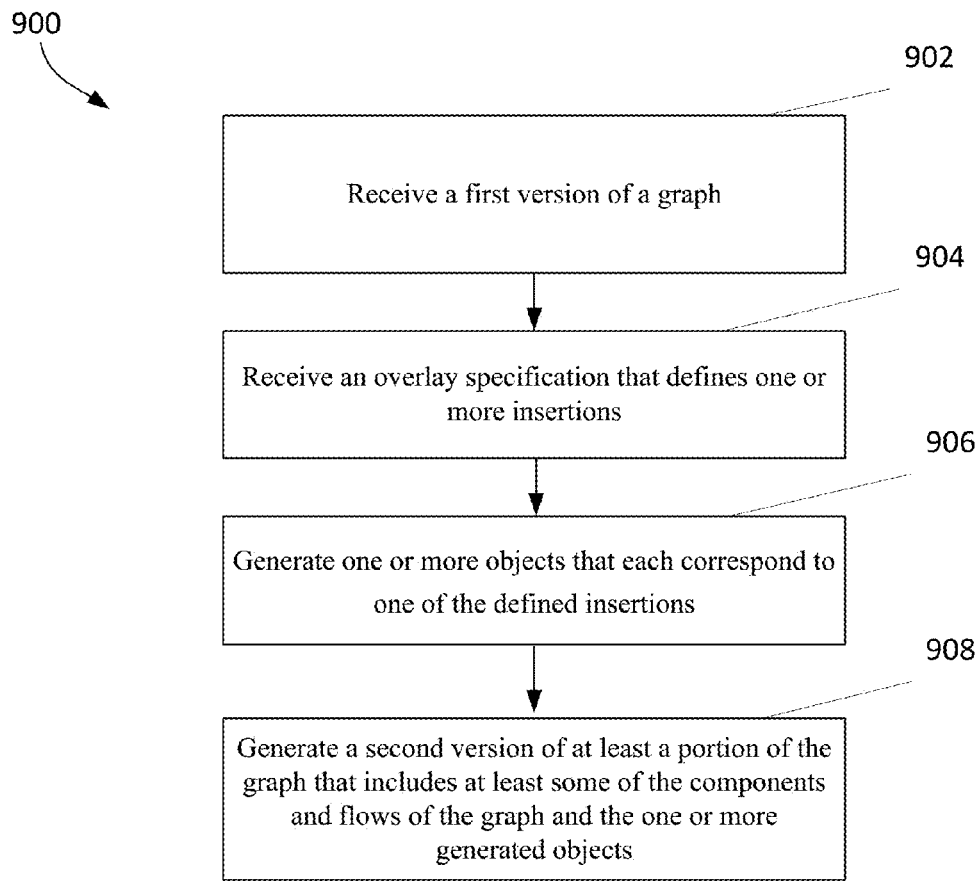
FIG. 9 is a flow chart.

FIG. 9 is a flowchart illustrating a debugging procedure 900. A first version of a graph (e.g., the graph 100 of FIG. 1) is received (902). For instance, the first version of the graph can be received into a short-term memory that is accessible by a processor. The first version of the graph 100 includes components and flows. The components represent operations performed on data records, and the flows represent flows of data records between components. The components may include the filter component 103, sort component 104, replication component 106, reformat component 108, filter by expression component 110, and gather component 112 shown in FIG. 1. The flows can include the replicate-reformat flow 116 and the gather-output data sink flow 118 shown in FIG. 1.

An overlay specification that defines one or more insertions is received (904). In some examples, the overlay specification is received from a developer or tester. In some examples, the overlay specification is defined automatically, e.g., as described above. The overlay specification may be the overlay specification 200 shown in FIG. 2. The overlay specification can include one or more insertion definitions (e.g., test source definition 201 and probe definition 213). An insertion definition can include a name, an upstream port, a downstream port, an insertion type, a prototype path, and a layout parameter (for test source definitions). Each of the defined insertions can be associated with a flow of the graph 100. Insertions can take the form of probes or test sources. Examples of insertions, in the form of components of a graph, include the test source insertion 502 and the probe insertion 504 of FIG. 5A. For example, the test source insertion 502 is associated with the database-filter flow 116 of the graph 100, and the probe insertion 504 is associated with the gather-output data sink flow 118 of the graph 100.

One or more objects are generated that each corresponds to one of the defined insertions (906). The objects may be components of a graph. Examples of objects include the test source insertion 502 and the probe insertion 504 of FIG. 5A. For example, the test source insertion 502 is associated with the replicate-reformat flow 116 of the graph 100, and the probe insertion 504 is associated with the gather-output data sink flow 118 of the graph 100.

A second version of at least a portion of the graph is generated that includes at least some of the components and flows of the portion of the graph 100 as well as the one or more generated objects (908). In some examples, the second version of the graph is a copy of the original graph 100 that is modified to include at least some of the components and flows of the portion of the graph 100 as well as the one or more generated objects. The second version of the graph can be visually represented by a modified graph (e.g., the second version of the graph 500 of FIG. 5A). Each object is inserted at the flow associated with the defined insertion that corresponds to the object. For example, with reference to the second version of the graph 500, the test source insertion 502 is inserted into the replicate-reformat flow 116, and the probe insertion 504 is inserted into the gather-output data sink flow 118. While the generated insertion objects may appear in the second version of the graph 500 along with the data processing components of the graph 100, the first version of the graph 100 (or the file containing the first version of the graph 100) is not modified. 27

While we described a compiler (e.g., compiler 608 of FIG. 6 and compiler 712 of FIG. 7) that can compile the graph and the overlay specification to create second version of the graph that includes the insertions defined by the overlay file, in some embodiments, the graph and the overlay specification are not compiled. For example, the graph and the overlay specification can be executed directly without being compiled. An interpreter can execute the graph and the overlay specification directly by translating each statement into a sequence of one or more subroutines that are already compiled into machine code.

While we have described insertions in the form of probes and test sources, in some embodiments, insertions can take on other forms. Insertions can broadly be used to inject data at a given point of a graph and pull data from a given point of a graph. For example, an insertion can be designed to monitor the quality of data passing through a flow of a graph. If data quality falls below a threshold, a user can receive an automated alert. Further description of insertions can be found in U.S. application Ser. No. 14/715,904, the contents of which are incorporated here by reference in their entirety.

Furthermore, while we have described insertions in the context of graphs, in some embodiments, insertions can be used in conjunction with other executable applications. For instance, data sources and output data sinks for a generic executable application can be identified through an automated analysis of the application. The identified data sources and output data sinks can be replaced by test sources and probes, respectively. In this way, the executable application can process data from a test source and output data to a probe. This configuration can be useful for testing or debugging the executable application.

The debugging approach described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of graphs. The modules of the program (e.g., elements of a graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

For instance, in addition to or as an alternative to the features described above, the following embodiments are described:

Embodiment 1 is directed to a method including analyzing, by a processor, a first version of a computer program. The analyzing includes identifying a first data processing element included in the first version of the computer program. The first data processing element references a first data source external to the first version of the computer program. The method includes generating a data source element that represents a second data source different from the first data source. The method includes generating a second version of the computer program. The second version of the computer program includes the generated data source element and a second data processing element that is based on the first data processing element. In the second version of the computer program, the second data processing element references the generated data source element.

Embodiment 2 is directed to embodiment 1, wherein the method includes determining a location of the second data source.

Embodiment 3 is directed to any of the preceding embodiments, wherein determining the location of the second data source comprises receiving an input indicative of the location.

Embodiment 4 is directed to any of the preceding embodiments, wherein the method includes presenting, in a user interface, an identifier of the identified first data processing element, the first data source, or both.

Embodiment 5 is directed to embodiment 4, wherein the method includes receiving a selection of the identified first data processing element, the first data source, or both.

Embodiment 6 is directed to any of the preceding embodiments, wherein analyzing the first version of the computer program includes analyzing an input flow into at least one of the data processing elements in the first version of the computer program.

Embodiment 7 is directed to any of the preceding embodiments, wherein the method includes analyzing the first version of the computer program at runtime of the computer program.

Embodiment 8 is directed to any of the preceding embodiments, wherein The computer program includes a graph.

Embodiment 9 is directed to embodiment 8, wherein generating the second version of the computer program comprises locating the generated data source element at an input flow to the second data processing element.

Embodiment 10 is directed to any of the preceding embodiments, wherein data from the second data source has the same format as data from the first data source.

Embodiment 11 is directed to any of the preceding embodiments, wherein generating the data source element includes defining an overlay specification for the generated data source element.

Embodiment 12 is directed to any of the preceding embodiments, wherein the method includes populating the second data source with data based on data from the first data source.

Embodiment 13 is directed to any of the preceding embodiments, wherein, in the first version of the computer program, a third data processing element references a first data destination external to the first version of the computer program. In the second version of the computer program, a fourth data processing element that is based on the third data processing element references a second data destination different from the first data destination.

Embodiment 14 is directed to any of the preceding embodiments, wherein the method includes identifying a third data processing element included in the first version of the computer program. The third data processing references a first data destination external to the first version of the computer program. The method includes generating an output element that represents a second data destination different from the first data destination. The second version of the computer program includes the generated output element and a fourth data processing element that is based on the third data processing element. In the second version of the computer program, the fourth data processing element references the generated output element.

Embodiment 15 is directed to embodiment 14, wherein the method includes determining a location of the second data destination.

Embodiment 16 is directed to embodiment 15, wherein determining the location of the second data destination comprises receiving an input indicative of the location.

Embodiment 17 is directed to any of the preceding embodiments, wherein the method includes executing the second version of the computer program.

Embodiment 18 is directed to any of the preceding embodiments, wherein executing the second version of the computer program enables debugging of the computer program.

Embodiment 19 is directed to any of the preceding embodiments, wherein generating the second version of at least a portion of the computer program includes generating a copy of the portion of the computer program.

Embodiment 20 is directed to embodiment 19, wherein the method includes modifying the copy of the portion of the computer program to include the generated data source element.

What is claimed is:

1. A method including:
   analyzing, by a processor, a first version of a computer program, the analyzing including identifying a first data processing element included in the first version of the computer program, the first data processing element referencing a first source of data records external to the first version of the computer program;
   identifying a second source of data records different from the first data source of data records;
   generating a data source element distinct from the second source of data records and that represents the second source of data records, including defining a specification for the data source element including information indicative of (1) a location of the second source of data records and (2) a position for the generated data source element in the computer program; and
   generating a second version of the computer program based on the first version of the computer program and the specification for the data source element, the second version of the computer program including the generated data source element and a second data processing element that is based on the first data processing element, wherein the first version of the computer program is not modified by the generation of the second version of the computer program;
   in which, in the second version of the computer program, the second data processing element references the generated data source element.

2. The method of claim 1, in which identifying the second source of data records includes determining a location of the second data source.

3. The method of claim 2, in which determining the location of the second source of data records comprises receiving an input indicative of the location.

4. The method of claim 1, including presenting, in a user interface, an identifier of the identified first data processing element, the first source of data records, or both.

5. The method of claim 4, including receiving a selection of the identified first data processing element, the first source of data records, or both.

6. The method of claim 1, in which analyzing the first version of the computer program includes analyzing an input flow into at least one of the data processing elements in the first version of the computer program.

7. The method of claim 1, including analyzing the first version of the computer program at runtime of the computer program.

8. The method of claim 1, in which the computer program comprises a graph.

9. The method of claim 8, in which generating the second version of the computer program comprises locating the generated data source element at an input flow to the second data processing element.

10. The method of claim 1, in which data from the second source of data records has the same format as data from the first data source.

11. The method of claim 1, including populating the second source of data records with data based on data from the first source of data records.

12. The method of claim 1, in which, in the first version of the computer program, a third data processing element references a first destination for data records, the first destination external to the first version of the computer program, and in which, in the second version of the computer program, a fourth data processing element that is based on the third data processing element references a second destination for data records different from the first destination for data records.

13. The method of claim 1, in which the method includes:
identifying a third data processing element included in the first version of the computer program, the third data processing referencing a first destination for data records external to the first version of the computer program; and
generating an output element that represents a second destination for data records different from the first destination for data records;
in which the second version of the computer program includes the generated output element and a fourth data processing element that is based on the third data processing element, and
in which, in the second version of the computer program, the fourth data processing element references the generated output element.

14. The method of claim 13, including determining a location of the second destination for data records.

15. The method of claim 13, in which determining the location of the second destination for data records comprises receiving an input indicative of the location.

16. The method of claim 1, including executing the second version of the computer program.

17. The method of claim 1, in which executing the second version of the computer program enables debugging of the computer program.

18. The method of claim 1, in which generating the second version of at least a portion of the computer program includes generating a copy of the portion of the computer program.

19. The method of claim 18, including modifying the copy of the portion of the computer program to include the generated data source element.

20. A system including:
means for analyzing, by a processor, a first version of a computer program, the analyzing including identifying a first data processing element included in the first version of the computer program, the first data processing element referencing a first source of data records external to the first version of the computer program;
means for identifying a second source of data records different from the first source of data records;
means for generating a data source element distinct from the second source of data records and that represents the second source of data records, including defining a specification for the data source element including information indicative of (1) a location of the second source of data records and (2) a position for the generated data source element in the computer program; and
means for generating a second version of the computer program based on the first version of the computer program and the specification for the data source element, the second version of the computer program including the generated data source element and a second data processing element that is based on the first data processing element, wherein the first version of the computer program is not modified by the generation of the second version of the computer program;
in which, in the second version of the computer program, the second data processing element references the generated data source element.

21. A system including:
a processor coupled to a memory, the processor and memory configured to:
analyze, by the processor, a first version of a computer program, the analyzing including identifying a first data processing element included in the first version of the computer program, the first data processing element referencing a first source of data records external to the first version of the computer program;
identify a second source of data records different from the first source of data records;
generate a data source element distinct from the second source of data records and that represents the second source of data records, including defining a specification for the data source element including information indicative of (1) a location of the second source of data records and (2) a position for the generated data source element in the computer program; and
generate a second version of the computer program based on the first version of the computer program and the specification for the data source element, the second version of the computer program including the generated data source element and a second data processing element that is based on the first data processing element, wherein the first version of the computer program is not modified by the generation of the second version of the computer program;
in which, in the second version of the computer program, the second data processing element references the generated data source element.

22. A non-transitory computer-readable medium storing instructions for causing a computing system to:
analyze, by a processor, a first version of a computer program, the analyzing including identifying a first data processing element included in the first version of the computer program, the first data processing element referencing a first source of data records external to the first version of the computer program;
identify a second source of data records different from the first source of data records;
generate a data source element distinct from the second source of data records and that represents the second source of data records, including defining a specification for the data source element including information indicative of (1) a location of the second source of data records and (2) a position for the generated data source element in the computer program; and
generate a second version of the computer program based on the first version of the computer program and the specification for the data source element, the second version of the computer program including the generated data source element and a second data processing element that is based on the first data processing element, wherein the first version of the computer program is not modified by the generation of the second version of the computer program;

in which, in the second version of the computer program, the second data processing element references the generated data source element.

23. The system of claim 21, in which identifying the second source of data records includes determining a location of the second data source.

24. The system of claim 21, in which analyzing the first version of the computer program includes analyzing an input flow into at least one of the data processing elements in the first version of the computer program.

25. The system of claim 21, in which the processor and memory are configured to analyze the first version of the computer program at runtime of the computer program.

26. The system of claim 21, in which the computer program comprises a graph.

27. The system of claim 26, in which generating the second version of the computer program comprises locating the generated data source element at an input flow to the second data processing element.

28. The system of claim 21, in which the processor and memory are configured to populate the second source of data records with data based on data from the first source of data records.

29. The system of claim 21, in which, in the first version of the computer program, a third data processing element references a first destination for data records external to the first version of the computer program, and in which, in the second version of the computer program, a fourth data processing element that is based on the third data processing element references a second destination for data records different from the first destination for data records.

30. The system of claim 21, in which the processor and memory are configured to:
identify a third data processing element included in the first version of the computer program, the third data processing referencing a first destination for data records external to the first version of the computer program; and
generate an output element that represents a second destination for data records different from the first destination for data records;
in which the second version of the computer program includes the generated output element and a fourth data processing element that is based on the third data processing element, and
in which, in the second version of the computer program, the fourth data processing element references the generated output element.

31. The system of claim 30, in which the processor and memory are configured to determine a location of the second destination for data records.

32. The system of claim 21, in which the processor and memory are configured to execute the second version of the computer program.

33. The system of claim 21, in which generating the second version of at least a portion of the computer program includes generating a copy of the portion of the computer program.

34. The system of claim 33, in which the processor and memory are configured to modify the copy of the portion of the computer program to include the generated data source element.

35. The non-transitory computer-readable medium of claim 22, in which identifying the second source of data records includes determining a location of the second source of data records.

36. The non-transitory computer-readable medium of claim 22, in which analyzing the first version of the computer program includes analyzing an input flow into at least one of the data processing elements in the first version of the computer program.

37. The non-transitory computer-readable medium of claim 22, storing instructions for causing the computing system to analyze the first version of the computer program at runtime of the computer program.

38. The non-transitory computer-readable medium of claim 22, in which the computer program comprises a graph.

39. The non-transitory computer-readable medium of claim 38, in which generating the second version of the computer program comprises locating the generated data source element at an input flow to the second data processing element.

40. The non-transitory computer-readable medium of claim 22, storing instructions for causing the computing system to populate the second source of data records with data based on data from the first source of data records.

41. The non-transitory computer-readable medium of claim 22, in which, in the first version of the computer program, a third data processing element references a first destination for data records external to the first version of the computer program, and in which, in the second version of the computer program, a fourth data processing element that is based on the third data processing element references a second destination for data records different from the first destination for data records.

42. The non-transitory computer-readable medium of claim 22, storing instructions for causing the computing system to:
identify a third data processing element included in the first version of the computer program, the third data processing referencing a first destination for data records external to the first version of the computer program; and
generate an output element that represents a second destination for data records different from the first destination for data records;
in which the second version of the computer program includes the generated output element and a fourth data processing element that is based on the third data processing element, and
in which, in the second version of the computer program, the fourth data processing element references the generated output element.

43. The non-transitory computer-readable medium of claim 42, storing instructions for causing the computing system to determine a location of the second destination for data records.

44. The non-transitory computer-readable medium of claim 22, storing instructions for causing the computing system to execute the second version of the computer program.

45. The non-transitory computer-readable medium of claim 22, in which generating the second version of at least a portion of the computer program includes generating a copy of the portion of the computer program.

46. The non-transitory computer-readable medium of claim 45, storing instructions for causing the computing system to modify the copy of the portion of the computer program to include the generated data source element.

\* \* \* \* \*

UNITED STATES PATENT AND TRADEMARK OFFICE
CERTIFICATE OF CORRECTION

PATENT NO. : 9,880,818 B2
APPLICATION NO. : 14/715807
DATED : January 30, 2018
INVENTOR(S) : Marshall A. Isman and John Joyce Page 1 of 1

It is certified that error appears in the above-identified patent and that said Letters Patent is hereby corrected as shown below:

In the Claims

Column 20, Line 29, Claim 1, after "first" delete "data".

Signed and Sealed this
Twentieth Day of August, 2019

Andrei Iancu
*Director of the United States Patent and Trademark Office*